(No Model.)
W. D. MILLER.
FIRE HOSE SPANNER.
No. 506,326. Patented Oct. 10, 1893.
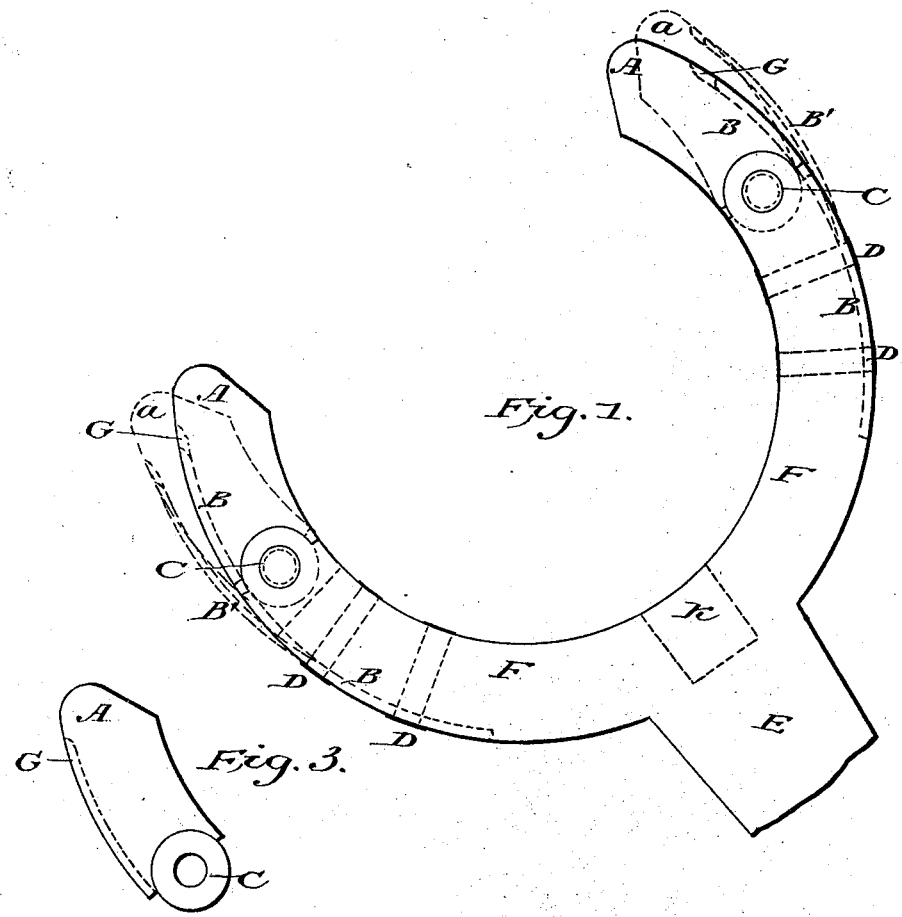
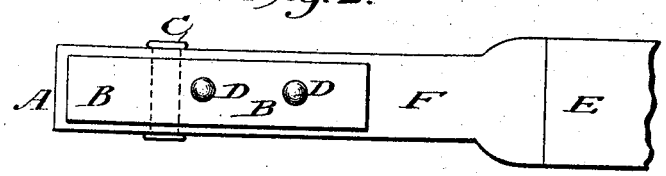
Witnesses.
Frank Grundler
Elmore W Mary
William Dunham Miller Inventor.
by
Emanuel D. Killian
his attorney

UNITED STATES PATENT OFFICE.

WILLIAM DUNHAM MILLER, OF SANFORD, FLORIDA.

FIRE-HOSE SPANNER.

SPECIFICATION forming part of Letters Patent No. 506,326, dated October 10, 1893.

Application filed August 15, 1892. Serial No. 443,143. (No model.)

*To all whom it may concern:*

Be it known that I, WILLIAM DUNHAM MILLER, a citizen of the United States, residing at Sanford, in the county of Orange and State of Florida, have invented a new and useful Implement for Coupling and Uncoupling Fire-Hose, entitled "The Adhesive Spanner," of which the following is a specification.

The object of my invention is to save time and labor in coupling and uncoupling hose joints when fire departments are preparing to extinguish fire. I attain this object by means of the mechanism illustrated in the accompanying drawings in which—

Figure 1, is a plan view of the spanner. Fig. 2, is a side elevation thereof, and Fig. 3, is a plan of one of the yielding or spring lips of the spanner.

The method of using my invention is as follows:—The man whose duty it is to couple and uncouple the joints of hose, stands astride, holding the hose firmly between his knees, with one hand grasps the hose and with the other applies the adhesive spanner to turn the collar of the hose connection. This "adhesive spanner" remains attached in position when the operator is compelled to move his hand from one side of the hose to the other to effect a complete turn of the collar.

My invention consists of a metal semi-circular spanning tool with a handle "E" of convenient length, and two lips "A" movable at joints "C," and of two springs "B." The spanner has the usual socket K for engaging the collar of the hose. The semi-circular part consists of two jaws "F" forming a yoke. The ends of these jaws are made as in Fig. 1. to receive the lips "A," shown in Fig. 3. The lips "A" turn outward on hinges "C" only enough to admit the collar of the hose when the spanner is pressed against the convex collar. This pressure forces the lips "A" into position "a" Fig. 1. A stout spring "B," held firmly in a slot "G" by rivets "D" "D" holds the lip in the circular arc until pressed outward as aforesaid.

Having fully described my invention, my claim is—

In a spanner the combination with the semi-circular body or yoke of pivoted lips A secured to the extremities of the yoke arms and springs attached to one and pressing upon the other of these parts whereby the lips are forced inward, as set forth.

WILLIAM DUNHAM MILLER.

Witnesses:
JAMES A. MILLER,
HORACE M. KILLIAN